April 13, 1943.  H. R. HOWSER  2,316,165
PROCESS OF MAKING COMPOSITE FROZEN EDIBLE PRODUCTS
Filed Dec. 4, 1940
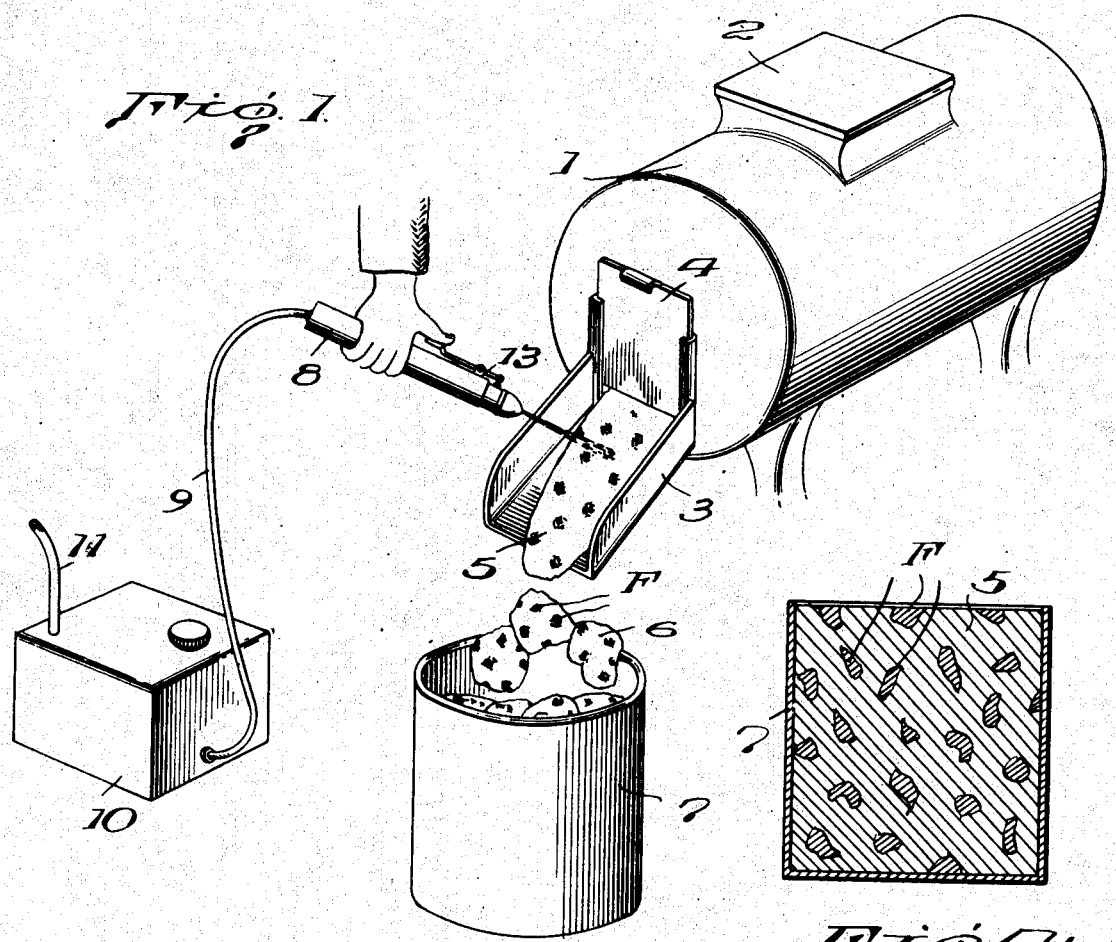
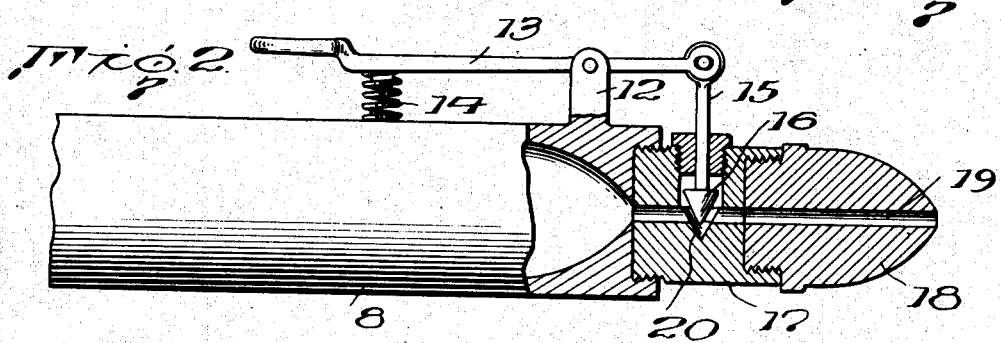
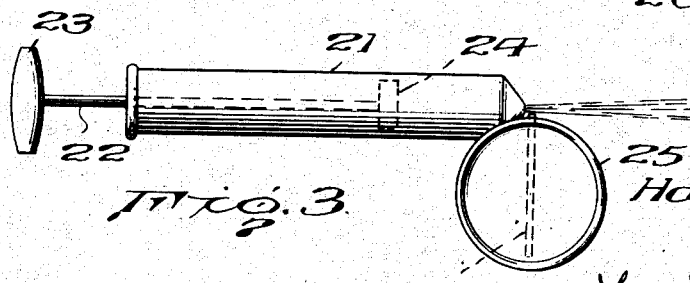
Inventor
Harry R. Howser,
By Leo L. Townshend
Attorney Patented Apr. 13, 1943

2,316,165

UNITED STATES PATENT OFFICE 2,316,165

PROCESS OF MAKING COMPOSITE FROZEN EDIBLE PRODUCTS

Harry R. Howser, Washington, D. C.

Application December 4, 1940, Serial No. 368,532

7 Claims. (Cl. 107—54)

The present invention relates to the manufacture of an improved composite edible frozen product, and it has particular relation to a bulk or packaged sherbet, ice milk, ice cream, frozen custard, or the like substances having a plastic edible flavoring material of contrasting characteristics dispersed therein in disconnecting portions.

One of the most popular forms of eating a combination of such substances and a flavoring material is the conventional ice cream sundae, which is made by pouring a separate liquid flavoring material over an individual serving of sherbet, ice milk, ice cream, frozen custard, or the like.

Another popular form of manufacturing and selling a similar composite product is to insert within an individual serving of such basic substances a solidly frozen core of flavoring material which returns to a liquid state at ice cream serving temperatures, and which, when the body portion is broken, runs out and down over the remainder of the substance forming substantially the conventional sundae.

While the product of the present invention is entirely unlike the conventional sundae, it may, nevertheless, be manufactured and sold in direct competition with and as a substitute for the conventional sundae type of product. The product of the present invention, however, obviates all of the disadvantages of the conventional sundae and provides a product which can be manufactured at a central manufacturing plant, delivered, dispensed, and consumed at places remote therefrom as easily and readily as an individual portion of plain sherbet, ice milk, ice cream, frozen custard, or the like, thereby eliminating the necessity of handling and serving a separate sticky and messy flavoring material at the time the basic substance is being served. Furthermore, the product made in accordance with the process of this invention permits for the first time the dispensing of a sundae type of product in the form of an ice cream cone or a frozen stick confectionery product.

An object of the present invention is the provision of the new, simple and inexpensive process for making a new and improved composite product comprising a basic edible substance, such as sherbet, ice milk, ice cream, frozen custard or the like, having relatively small portions of flavoring material of contrasting characteristics scattered therethrough in disconnected portions in such a manner that a small serving, such as a spoonful of the finished product, cannot be eaten without consuming some of the flavoring material along with the basic substance. In this new product the disconnected portions of the flavoring material, having contrasting characteristics such as taste, color, appearance, texture, density, etc., are relatively small as compared to the total volume of the finished product, but the disconnected portions of flavoring material, per se, are relatively large and of a substantial volume as compared to substances of conventional particle size, such as for example, chopped nuts, candy granules or comminuted farinaceous material.

Another object of the present invention is to provide a new and improved process for the manufacture of a product embodying relatively small amounts of flavoring material in disconnected portions scattered throughout a relatively large amount of basic frozen edible substances in such a way that small portions, such as a spoonful, of the basic substance cannot be consumed without consuming some of the flavoring material with each portion thereof.

Another object of the invention is to provide an efficient, economical and sanitary manner of embodying a contrasting flavoring material uniformly in a frozen edible basic substance to produce a new and novel composite product.

A further object of the invention is to provide a simple and inexpensive method of process for embodying a contrasting edible flavoring material into a combination product of the character described, which will be pleasing, attractive in appearance and appetizing.

Another object of the invention is the provision of a process for making a composite frozen edible product of the character above described, which becomes increasingly attractive in appearance through the final step of scooping or dipping small individual servings thereof from a large bulk container.

A further object of the invention is to provide a simple and inexpensive method for producing a variegated product of the character described having discontinuous sinuous strips of contrasting flavoring material dispersed uniformly therethrough.

Other and further objects of the invention will be apparent from a detail description thereof, wherein only a preferred form of embodiment of the invention is shown and described reference being had to the accompanying drawing, forming a part hereof, in which:

Figure 1 is a general view of the process employed to manufacture the composite frozen edible product showing the apparatus used in perspective;

Figure 2 is an elevation partly in section of the nozzle portion of the pressure gun;

Figure 3 shows in side elevation a modified form of pressure gun;

Figure 4 is a vertical section of a container filled with the product of my invention.

Referring to the drawing, there is shown in Figure 1 a conventional commercial basic substance freezer 1 for sherbet, ice milk, ice cream, frozen custard and the like having a mix inlet 2 at the top and a partially frozen substance outlet at one end provided with a trough like inclined spout 3. The outlet is controlled by a slide valve 4 normally opened sufficiently to permit the partially frozen basic substance 5 to flow therefrom and down the spout in a flat stream that is of relatively slight thickness as compared to its width. Into this stream or mass of basic substance is injected the flavoring material F.

The flavoring material F is a liquid syrup flavoring material of a contrasting color to the basic substance, which remains a liquid at normal temperatures and attains the consistency of the bulk basic substance at refrigerating temperatures, being then a form retaining plastic that is deformable. By the term "form retaining plastic that is deformable" I mean to indicate that the flavoring syrup material is subject to deformation in the same conventional manner as the basic substance, namely, sherbet, ice milk, ice cream, frozen custard, and the like at normal serving temperature. This characteristic is essential otherwise the finished composite product could not be dipped or scooped for dispersing purposes from a large container for sale in bulk form.

The flavoring material F is injected over the entire surface area of the mass of basic material 5 by discharging a plurality of spaced relatively short separate portions by a pressure gun 8. The gun 8 is successively or intermittently operable and moved or shifted after each discharge so each separate portion of ejected flavoring material is of substantial volume as compared to particle size and arranged in spaced relation to other portions in the basic material. The flat stream of flavor material injected basic substance drops from the spout into a container 7, breaking up into gobs 6 during such passage. As it settles in the container the result is a bulk package of basic substance as shown in Figure 4 having throughout the entire area of the mass a plurality of spaced relatively short sinuous portions of contrasting flavoring syrup material each being of substantial volume as compared to particle size. The dropping of the basic substance into the container in the manner shown additionally disperses the separate flavoring material portions in a helter skelter arrangement in all directions throughout the basic substance.

The pressure injection apparatus disclosed is a gun 8 having a hollow barrel adapted to be grasped by the operator's hand and manually manipulated. The rear end of the gun is connected by a flexible tube 9 with a flavor material container tank 10 to the top of which air or other fluid pressure is applied from a source not shown, by the conduit 11.

Adjacent the front end of the gun 8 is an upstanding lug 12 to which is fulcrumed a lever 13 with its inner end normally urged upwardly by an expansion spring 14 interposed between the same and gun 8. The outer end of the lever 13 has loosely pivotally connected thereto a depending valve stem 15 terminating in a conical valve 16.

The nozzle of the gun is formed of an inner portion 17 and a detachably connected outer portion 18, each having an aligned passage 19, that also communicates with the barrel of the gun 8 when the nozzle is attached thereto. In the inner portion 17 is a transverse opening terminating in a conical seat bisecting the passage 19 and adapted to receive the valve 16 to close said passage. This opening is closed by a plug through which the valve stem 15 passes.

With this arrangement the valve is normally closed and any flavoring material in the barrel of the gun 8 is retained therein. The gun may be successively or intermittently operated by successive slight pressure of the thumb on the inner end of the valve operating lever 13 which will open the passage 19 as shown in Figure 2 and allow flavoring material under pressure from the tank 10 to be ejected from the nozzle into the partly frozen basic substance. The valve is only held open long enough to allow the ejection of a portion of flavoring material that will form in the basic substance an individual short sinuous portion of substantial volume as compared to particle size. Sufficient pressure is employed to inject each portion of flavoring material into the mass of the partly frozen basic substance. As the basic substance mass being treated is in a flat stream of relatively slight thickness as compared to width the injection will be through substantially the entire thickness of the mass. By shifting or moving and successively operating the pressure gun the entire surface area of the basic substance can be impregnated as shown in Figure 1. By successively operating the pressure gun and shifting or moving the same after each discharge, the entire surface area of the basic substance can be impregnated as shown in Figure 1. The relative movement between the pressure gun and the basic substance after each successive discharge will separate the individual portions of flavoring material in spaced relation to each other. The additional step of dropping the gobs of impregnated basic substance in the container will produce a helter-skelter effect in the final product.

In Figure 3 I have shown a modified form of pressure gun comprising a cylinder 21 having therein a piston head 24 given a rectilinear movement through the cylinder by a rod 22 and handle 23. The outer end of the cylinder has a nozzle terminating adjacent an outlet pipe 26 from the container 25. The container 25 receives flavoring material of the character previously described. Upon operation of the piston in a manner well understood, air from the cylinder is forced under pressure across the outer end of the outlet pipe 26, which will carry the flavoring material in the form of a spray to the basic substance to be treated. This flavoring material is under sufficient pressure to inject in the plastic basic material. On its forward movement the piston is successively and intermittently operated to inject the flavoring material in short spurts each containing sufficient volume of flavoring to form in the basic substance individual short sinuous portions of flavoring material of substantial volume as compared to particle size. Due to the fact this method of injection employs the spray principle the portions of flavoring material formed by each spurt will not be quite as dense as in the method shown in Figure 1, but will be sufficient to clearly distinguish from the basic substance and assume the shape and have enough volume upon injection to produce the product described.

When reference is made to normal temperatures, it is understood that I mean normal atmospheric temperatures as are found out-of-doors in the summer time, viz. between 50° F. and 100° F. When reference is made to refrigerating temperatures, it is to be understood that I am referring primarily to temperatures below 32° F. The term "congealed" as used in this specification is to be understood to define a change in state brought about by a lowering of the temperature as for example, water becomes ice at 32° F., changing from a liquid to a solid state.

The term "consistency" as used herein in connection with the flavoring material indicates that such material remains at substantially the same degree of plasticity as the basic substance at corresponding temperatures, and that it is of a character such that it will not commingle with the basic substance at corresponding refrigerating temperatures, remaining separate and distinct and maintaining clear lines of demarcation between the basic substance and the flavoring material at all such temperatures. The firmness and density may vary, but the same "consistency" is maintained at refrigerating temperatures so that the contrast between the flavoring material and basic substance is always sharp and distinct.

This application is a continuation in part of my application, Serial Number 233,819, filed October 7, 1938, wherein the product is claimed.

Although I have only described in detail one embodiment of the invention, it will be apparent to those skilled in the art that the invention is not so limited, but that various modifications may be made therein without departing from the spirit thereof or from the scope of the appended claims.

I claim:

1. The method of manufacturing a variegated bulk product which comprises spreading an unconfined mass of partially frozen basic substance and embedding successive portions of flavoring syrup material of contrasting characteristics and of substantial volume as compared to particle size in the surface area thereof, said portions being spaced at random in a multiplicity of directions over the surface area of the unconfined basic substance.

2. The method of manufacturing a variegated bulk product which comprises spreading an unconfined mass of partially frozen basic substance of relatively slight thickness as compared to width and embedding successive portions of flavoring syrup material of contrasting characteristics and of substantial volume as compared to particle size in the surface area thereof, said portions being spaced at random in a multiplicity of directions over the surface area of the unconfined basic substance.

3. The method of manufacturing a variegated bulk product which comprises spreading an unconfined mass of partially frozen basic substance and embedding successive portions of flavoring syrup material of contrasting characteristics and of substantial volume as compared to particle size in the surface area thereof, said portions being spaced laterally and longitudinally from each other in a haphazard manner over the surface area of the unconfined basic substance.

4. The method of manufacturing a variegated bulk product which comprises spreading an unconfined mass of partially frozen basic substance and embedding successive portions of flavoring syrup material of contrasting characteristics and of substantial volume as compared to particle size in the surface area thereof, said portions being spaced at random in a multiplicity of directions over the surface area of the unconfined basic substance, and then breaking up the composite mass to further disperse the portions of flavoring syrup material in a helter skelter arrangement through the basic substance.

5. The method of manufacturing a variegated bulk product which comprises flowing an unconfined mass of partially frozen basic substance of substantial length as compared to the width dimensions and being of relatively slight thickness as compared to width and embedding successive portions of flavoring syrup material of contrasting characteristics and of substantial volume as compared to particle size in the surface area thereof, and said portions being spaced at random in a multiplicity of directions over the entire surface area of said basic substance.

6. The method of manufacturing a variegated bulk product which comprises moving as a mass a stream of unconfined partially frozen basic substance, said mass being relatively thin as compared to its width dimensions, and embedding successive portions of flavoring syrup material of contrasting characteristics and of substantial volume as compared to particle size in the surface area of said moving mass of basic substance, said portions being spaced at random in a multiplicity of directions over the entire surface area of said basic substance.

7. The method of manufacturing a variegated bulk product which comprises moving as a mass a stream of unconfined partially frozen basic substance, said mass being of substantial length as to its width dimensions and being of relatively slight thickness as compared to its width, and embedding successive portions of flavoring syrup material of contrasting characteristics and substantial volume as compared to particle size in the surface area of said moving mass of basic substance, said portions being spaced at random in a multiplicity of directions over the surface area of said basic substance.

HARRY R. HOWSER.